Jan. 28, 1964   R. E. DOEDEN   3,119,210
AIR OPERATED TOOL
Filed Aug. 8, 1961

INVENTOR.
ROLAND E. DOEDEN
BY
Oberlin, Maky & Donnelly
ATTORNEYS 3,119,210
AIR OPERATED TOOL
Roland E. Deeden, Ohio Rte. 18, Hicksville, Ohio
Filed Aug. 8, 1961, Ser. No. 130,104
1 Claim. (Cl. 51—245)

This invention relates generally, as indicated, to an air operated tool and more particularly to a machine tool attachment for a vertical or horizontal mill, boring machine, lathe, jig grinder or the like.

Heretofore, hole grinders or the like have been provided which are attached directly to a mill. Such grinders must, of course, incorporate an extremely complex and costly off-set mechanism therein which limits the size of the hole to be ground. However, with the present invention, a machine tool attachment such as a hole grinder is provided which utilizes a boring head, which heads are employed with practically all of the above machines. The size of the hole to be ground is thus limited only to the size of the boring head and the diameter of the grinding wheel which permits a greater range of use. Moreover, if a lot of stock has to be removed and a fine finish is required, an operator can bore the hole nearly to size and finish the hole with a tool in accordance with the present invention. Since boring is a faster means of removing stock than grinding, more production can be obtained by using the boring bar first to remove most of the stock and then substituting the hole grinder for the boring bar in the boring head for finishing. In this manner, the boring head need not be removed from the machine.

It is accordingly a principal object of the present invention to provide a machine tool attachment which can be employed with boring heads for jig grinding holes or male cylindrical members to precision tolerances.

It is another main object to provide a machine tool attachment for use with boring heads in machines such as vertical or horizontal mills, boring machines, lathes or jig borers which readily can be attached to such boring heads in place of a boring bar.

It is a further object to provide a machine tool attachment which may simply be substituted for a boring bar to grind a cylindrical work surface without changing the setup of the workpiece.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail a certain illustrative embodiment of the invention, this being indicative, however, of but one of the various ways in which the principle of the invention may be employed.

The present invention is an attachment to a vertical or horizontal mill, boring machine, lathe or the like and may preferably be employed in a vertical mill. The tool is not directly attached to the machine, but is used in conjunction with a boring head. The boring head is inserted in the collet of the mill and a tool in accordance with the present invention is then inserted in the boring head. The boring head determines the amount of off-set in relation to the spindle in the machine and the spindle of the machine is then rotated at a relatively slow r.p.m., e.g. 60 r.p.m., rotating the tool of the present invention in an orbit, the diameter of which is controlled by the setting of the boring head.

Figure 1:
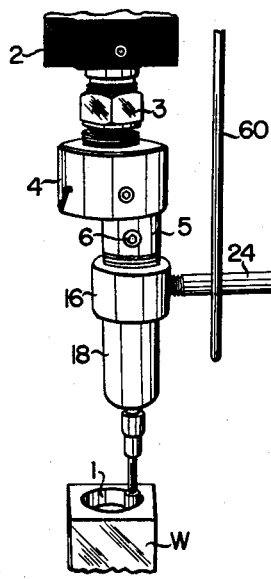
FIG. 1 is a fragmentary elevation of a hole grinder in accordance with the present invention showing the tool attached to an off-set boring head.
Figure 2:
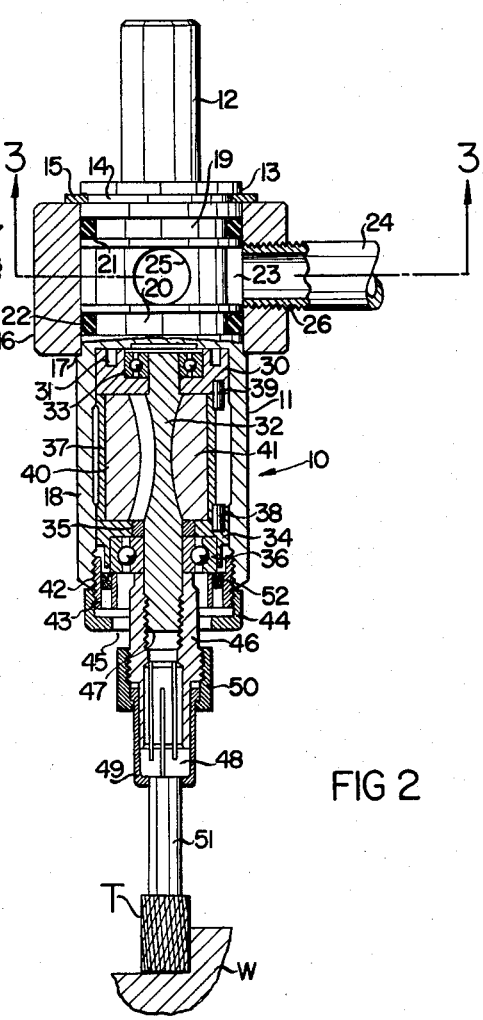
FIG. 2 is a fragmentary vertical section of such tool.
Figure 3:
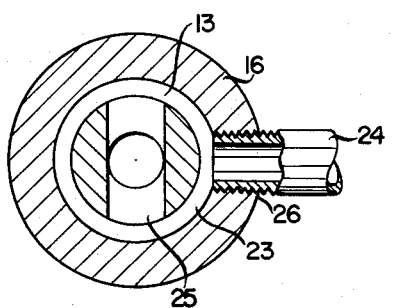
FIG. 3 is a horizontal section taken substantially on the line 3—3 of FIG. 2.

Referring first to FIG. 1, it will be seen that the illustrated embodiment of the present invention is attached to a jig boring machine to perform a grinding or finishing operation on the inside cylindrical surface 1 of a workpiece W. It will, however, be understood that the present invention is equally applicable to vertical or horizontal milling machines, boring machines, lathes or other types of machine tools.

The jig boring machine includes a spindle sleeve 2 for the spindle 3 and an off-set boring head 4. Such off-set boring head 4 is generally conventional and employs an adjustable slide fitted to the head body usually by a dovetail joint. The slide includes a cylindrical receptacle 5 usually to receive a boring bar or the like. The off-set head 4 is generally provided with a micrometer dial which aids in making fine adjustments of the slide correctly laterally to off-set the shank cylindrical receptacle 5. In this manner, a wide range of bore diameters may be reached and with large size tools, holes up to 10 inches in diameter may be bored. A boring bar receptacle 5 is provided with a set screw 6 adapted to clamp the boring bar firmly in position.

In place of the boring bar which initially formed the inside surface 1 of the hole in the workpiece W which is clamped to a table beneath the boring head, the accessory of the present invention is provided. Such machine tool accessory comprises an air motor 10 in a special housing 11 which includes a supporting shank 12 vertically coaxially extending from the cylindrical portion of the motor housing enclosing the motor 10. The motor housing 11 is provided with a slightly reduced diameter portion 13 which is provided with four distinct annular grooves. The first groove 14 accommodates a snap or lock ring 15 which holds a collar 16 against the shoulder 17 between the reduced diameter portion 13 and the cylindrical portion 18 of the motor housing 11 surrounding the motor 10. Grooves 19 and 20 are substantially identical in form and accommodate O-rings or the like 21 and 22 which provide spaced air seals between the collar 16 and the reduced diameter portion 13 of the housing 11. Between the O-rings, there is provided a relatively wide groove 23. The groove 23 provides air communication between air inlet pipe 24 and and transverse opening 25, which opening communicates directly with the motor 10 to drive the same. The air inlet pipe 24 is threaded in an opening in the collar 16 as shown at 26. An air shut-off valve 27 may be coupled directly to the air inlet pipe 24 as shown at 28 in FIG. 1. The motor housing and supporting shank is preferably precision machined in one piece and made from special deep carburizing steel which is case hardened, ground and chrome plated. Also, the collar 16 is preferably machined from a special deep carburizing steel and also case hardened, ground and chrome plated.

The pneumatic motor 10 includes an end plate 30. The end plate 30 is provided with an annular groove 31 which is in direct air communication with the opening 25 which communicates through the groove 23 with the air inlet pipe 24. The end plate 30 supports the proximal end of the rotor 32 by means of precision bearings 33. The rotor 32 extends coaxially in the housing 10 through an end plate 34 provided with a spacer 35 and precision bearings 36 supporting the outboard end of the rotor 32. Between the end plates, there is provided a cylinder or stator 37 which is connected to the end plates by pins 38 and 39. The motor includes blades 40 and 41 to rotate within the cylinder 37 driving the rotor 32. The end of the housing 11 is internally threaded as shown at 42 and a lock ring 43 is secured therein. A guard 44 having a center aperture 45 therein is threadedly connected to the lock ring 43. The aperture 45 in the guard 44 accommodates the chuck 46 which is threadedly secured to the rotor 32 as shown at 47. The chuck includes a collet 48 and a cap 49 axially moved by means of the internally threaded nut 50 threadedly secured to the chuck 46 and interengaging the cap 49. In this manner, the shank 51 of a tool T may be secured directly to the rotor 32 to be driven by the pneumatic motor 10.

The lock ring 43 may be provided with a muffler in the form of a porous sintered bronze ring 52. The lock ring 43 serves not only to clamp the motor assembly 10 within the housing 11 but also serves as a muffler to silence the high pitched whistling or whine which would otherwise occur if the air from the motor were exhausted directly to atmosphere.

Air entering the inlet pipe at, for example, 90 lbs. per square inch will pass through the transverse aperture 25 from the groove 23 and then into the annular groove 31 of the end plate 30. Suitable grooves not shown communicate the air to the blades 40 and 41 which drives the rotor 32 at high speed and thus the tool T connected thereto through shank 51. The air is then exhausted through the muffler 52 to be expelled through the opening 45 in the guard 44 generally along the shank of the rotor and tool T. The exhausting of the air from the motor not only cools the workpiece W, but removes dust or chips caused by the tool T from the workpiece. Reference may be had to my Patents Nos. 2,946,315 and 2,830,560 for a more complete disclosure of an air motor that may be employed with the present invention.

It will now be seen that as the spindle 3 of the jig boring machine rotates, it will cause the shank 12 of the air tool accessory to move through an orbital path, the diameter of which can be adjusted by the micrometer dial or the like within the off-set boring head 4. The shank 12 will be held within the collar on the side of the boring head by means of the set screw 6 and as the tool moves through its orbital path, the inlet pipe as well as the coupling 28 and valve 27 may be held against rotation therewith by any suitable stop as shown at 60 in FIG. 1.

The accessory of the present invention need not be much longer than the normal boring bar employed and it can be seen that the accessory can readily be substituted for the conventional boring bar. The tool itself will be adjusted through the normal adjustment of the boring head and, of course, the position of the workpiece may also be adjusted in machine tools. The accurate bearings 33 and 36 being employed, spindle run-outs can be held to a very low figure and maximum run-outs on the machine tool accessory shown is .0005". The diameter of shank 12 may vary from $3/8$ to $3/4$ of an inch and this will give an example of the size of the device in question. It can now be seen that the present invention need only simply be substituted for the boring bar to finish properly the interior surface 1 of the hole in the workpiece W. Speeds of as high as 25,000 to 30,000 r.p.m. may be obtained and substantial power with normal four blade rotary vane type air motors is also available.

It can now be seen that there is provided a jig grinding attachment with a cutting tool or mounted grinding wheel which includes its own power source to drive the same at extremely high speeds not otherwise obtainable by the machine tool itself.

Other modes of applying the principle of the invention may be employed, change being made as regards the details described, provided the features stated in the following claim or the equivalent of such be employed.

I, therefore, particularly point out and distinctly claim as my invention:

A machine tool attachment comprising a pneumatic motor, said pneumatic motor including an axially extending unitary housing, said housing having a reduced diameter portion adjacent one end thereof, a collar surrounding said reduced diameter portion, means to communicate air under pressure into said housing through said collar, an axially extending shank portion on said one end of said housing formed as one piece therewith adapted to be connected to a machine tool and the like, means to connect a tool to the rotor of said motor to be driven at high speed thereby, a groove in said reduced diameter portion of said housing enclosed by said collar, air seal means on opposite sides of said groove providing a seal between said collar and said reduced diameter portion of said housing, and a lock ring adapted to hold said collar on said reduced diameter portion of said housing.

References Cited in the file of this patent

UNITED STATES PATENTS

| | | |
|---|---|---|
| 2,405,748 | Johnson | Aug. 13, 1946 |
| 2,608,807 | Nilsen et al. | Sept. 2, 1952 |
| 2,648,939 | Zelik et al. | Aug. 18, 1953 |
| 2,715,806 | Hancock | Aug. 23, 1955 |
| 2,784,538 | Clark | Mar. 12, 1957 |

FOREIGN PATENTS

| | | |
|---|---|---|
| 250,138 | Switzerland | June 16, 1948 |